US010163551B2

(12) United States Patent
Hirao et al.

(10) Patent No.: US 10,163,551 B2
(45) Date of Patent: Dec. 25, 2018

(54) METHODS OF MANUFACTURING A COATED CONDUCTING WIRE ASSEMBLY

(71) Applicant: TOYOTA JIDOSHA KABUSHIKI KAISHA, Toyota-shi, Aichi-ken (JP)

(72) Inventors: Yasuyuki Hirao, Okazaki (JP); Hideki Manabe, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 255 days.

(21) Appl. No.: 15/155,484

(22) Filed: May 16, 2016

(65) Prior Publication Data

US 2016/0343475 A1    Nov. 24, 2016

(30) Foreign Application Priority Data

May 18, 2015  (JP) .................................. 2015-100919

(51) Int. Cl.
*H01R 43/00*  (2006.01)
*H01B 13/06*  (2006.01)
*H02K 3/14*  (2006.01)
*H02K 15/04*  (2006.01)
*H01B 13/02*  (2006.01)

(52) U.S. Cl.
CPC .............. *H01B 13/06* (2013.01); *H02K 3/14* (2013.01); *H02K 15/0414* (2013.01); *H01B 13/0292* (2013.01); *Y10T 29/49117* (2015.01)

(58) Field of Classification Search
CPC ........ H01B 13/06; H01B 11/12; H01B 13/02; H01B 13/0214; Y10T 29/49117

USPC ................. 29/825, 605, 846, 868, 869, 33 F
See application file for complete search history.

(56) References Cited

U.S. PATENT DOCUMENTS

| 4,604,861 A | 8/1986 | Matsuura et al. |
| 8,567,222 B2 * | 10/2013 | Ichikawa ........... H01B 13/0006 72/206 |
| 2016/0027551 A1 * | 1/2016 | Mizushima ........ H01B 13/0006 174/128.1 |

FOREIGN PATENT DOCUMENTS

| EP | 0 148 447 A2 | 7/1985 |
| JP | 2009-199749 A | 9/2009 |
| WO | 2015/056077 A2 | 4/2015 |

* cited by examiner

*Primary Examiner* — Thiem Phan
(74) *Attorney, Agent, or Firm* — Sughrue Mion, PLLC

(57) ABSTRACT

A method of manufacturing a coated conducting wire assembly includes forming a conducting wire assembly by twist-deforming a conducting wire bundle, forming a coated conducting wire assembly by covering the conducting wire assembly with an insulation coating, and annealing the coated conducting wire assembly. The conducting wire bundle is formed by bundling a plurality of conducting wires. The conducting wire assembly includes a parallel portion, a left-wound portion, and a right-wound portion. The annealing is performed by heating and holding the coated conducting wire assembly at an annealing temperature while applying tension to the covered conducting wire assembly.

20 Claims, 17 Drawing Sheets

F I G . 10
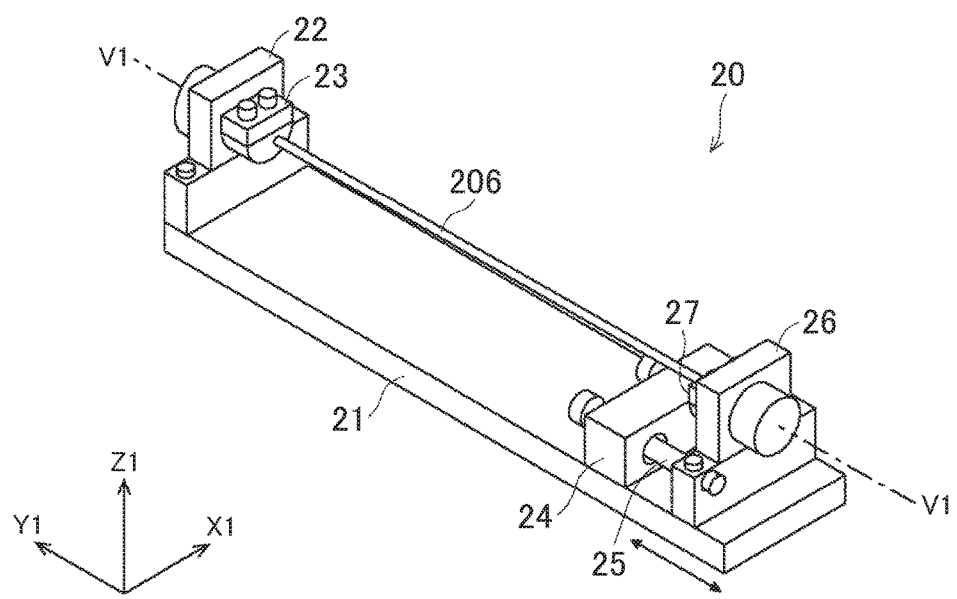

F I G . 13
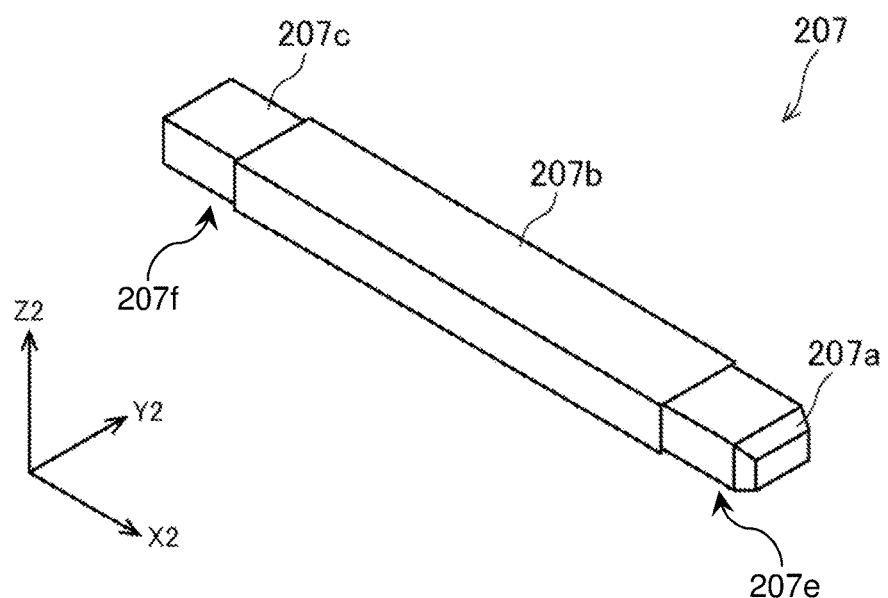
F I G . 14
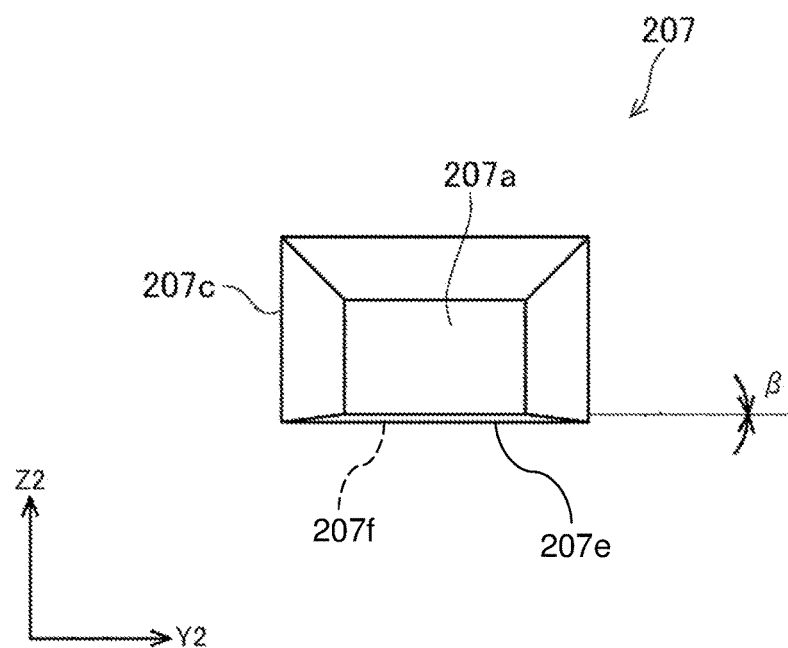

METHODS OF MANUFACTURING A COATED CONDUCTING WIRE ASSEMBLY

CROSS REFERENCE TO RELATED APPLICATIONS

The disclosure of Japanese Patent Application No. 2015-100919 filed on May 18, 2015 including the specification, drawings and abstract is incorporated herein by reference in its entirety.

BACKGROUND

1. Field

The present disclosure relates to a method of manufacturing a coated conducting wire assembly.

2. Description of Related Art

Japanese Patent Application Publication No. 2009-199749 (JP 2009-199749 A) describes a method of forming a conducting wire assembly by bundling a plurality of conducting wires together to form a conducting wire bundle, twisting the formed conducting wire bundle, and then covering it with an insulator coating.

SUMMARY

In the process of covering the conducting wire bundle with the insulator coating, twisting deformation may occur in a conducting wire assembly due to the conducting wire assembly being heated while tension is applied it.

For example, as shown in FIG. 21, a conducting wire assembly 901 is formed by twisting a conducting wire bundle. This conducting wire assembly 901 includes a left-wound portion 901b that is twisted around an axis of the conducting wire assembly 901 in a first direction, a plurality of parallel portions 901a that extend straight in the axial direction, and a right-wound portion 901c that is twisted around the axis of the conducting wire assembly 901 in a second direction opposite of the left-wound portion 901b. When covering the conducting wire assembly 901 with an insulator coating, untwisting deformation may occur in the conducting wire assembly 901. Untwisting deformation is twisting deformation in which the left-wound portion 901b and the right-wound portion 901c loosen, or more specifically, in which the conducting wire bundle is twisted in a rotational direction 902 that is opposite of the rotational direction in which the conducting wire bundle is twisted. This untwisting deformation causes the parallel portion 901a to expand, and the left-wound portion 901b and the right-wound portion 901c to decrease.

As shown in FIG. 22, for example, when untwisting deformation occurs, a first end portion 907a of a coated conducting wire assembly 907 may twist-deform with respect to a second end portion 907c of the coated conducting wire assembly 907. As shown in FIG. 23, a twisting angle α formed by the intersection of a side surface 907e of the first end portion 907a and a side surface 907f of the second end portion 907c may reach a size that is undesirable for the coated conducting wire assembly 907. In FIGS. 22 and 23, the coated conducting wire assembly 907 is shown as a single conducting wire to facilitate understanding.

The coated conducting wire assembly 907 described above may be annealed by heating the coated conducting wire assembly 907 to a predetermined temperature, and then maintaining this temperature for a predetermined period of time. This kind of annealing may ensure the necessary adhesion strength between the conducting wire assembly and the insulator coating. However, annealing may also end up causing further twisting deformation in the coated conducting wire assembly.

The present disclosure thus provides a method of manufacturing a coated conducting wire assembly that may correct twisting deformation.

An exemplary aspect of the present disclosure relates to a method of manufacturing a coated conducting wire assembly that may include bundling a plurality of conducting wires to thereby form a conducting wire bundle, twist-deforming the conducting wire bundle to thereby form a conducting wire assembly, covering the conducting wire assembly with an insulation coating to thereby form a coated conducting wire assembly, and annealing the coated conducting wire assembly by heating and holding the coated conducting wire assembly at an annealing temperature while applying tension to the coated conducting wire assembly. The adhesion strength between the coating and the conducting wire assembly may be increased while inhibiting twisting of the conducting wire assembly, so a coated conducting wire assembly in which twisting deformation is corrected may be manufactured.

The conducting wire assembly may be formed to include at least one parallel portion, a left-wound portion, and a right-wound portion.

The coated conducting wire assembly may include at least one conducting portion where the conducting wire assembly is exposed.

The annealing may include heating the coated conducting wire assembly to raise a temperature of the coated conducting wire assembly to the annealing temperature by direct resistance heating.

The direct resistance heating may be performed by supplying a current to the at least one conducting portion of the coated conducting wire assembly.

According to this aspect of the present disclosure, when heating is performed from outside the coated conducting wire assembly, the insulation coating may act as a thermal insulator. As such, heat may not be effectively transmitted to the contact portion between the conducting wire assembly and the insulation coating. However, the temperature of the coated conducting wire assembly may be raised to the annealing temperature in a short period of time by generating Joule heat inside the conducting wire assembly of the coated conducting wire assembly. As a result, a coated conducting wire assembly in which twisting deformation has been corrected is able to be manufactured with high productivity.

In the aspect described above, the annealing may include applying tension to the coated conducting wire assembly while both end portions of the coated conducting wire assembly are fixed such that an angle of twist from untwisting deformation is maintained within a range of predetermined angles.

The range of predetermined angles may be between +2 degrees and −2 degrees.

The angle of twist may be maintained at essentially 0 degrees.

According to this aspect of the present disclosure, tension is applied while further inhibiting twisting of the coated conducting wire assembly. As a result, a coated conducting wire assembly in which twisting deformation is even more reliably corrected is able to be manufactured.

In the aspect described above, the coated conducting wire assembly may be shortened by cutting the coated conducting wire assembly.

According to this aspect, the coated conducting wire assembly may be easier to maneuver because it is shorter. As a result, heating treatment may be performed for each shortened coated conducting wire assembly. As such, the heating apparatus or the like such may be smaller. Further, tension may be applied individually to the shortened coated conducting wire assemblies. As a result, the applied tension may be reduced. As such, the tensioning device that applies the tension is able to be smaller.

In the aspect described above, the conducting wire bundle may be pressure rolled to thereby provide the conducting wire bundle with a rectangular cross-section.

An exemplary aspect of the present disclosure relates to a method of manufacturing a coated conducting wire assembly that includes bundling a plurality of conducting wires to thereby form a conducting wire bundle, twist-deforming the conducting wire bundle to thereby form a twisted assembly conductor, applying pressure to the twisted assembly conductor to thereby form a first assembly conductor, wherein the first assembly conductor includes a core wire and a plurality of peripheral wires, forming an oxide film between the core wire and the plurality of peripheral wires and between the peripheral wires to thereby form a second assembly conductor, covering the second assembly conductor with an insulation coating to thereby form a coated conducting wire assembly, cutting the coated conducting wire assembly to thereby form a shortened conducting wire assembly, cutting and stripping the insulation coating from at least one end portion of the shortened conducting wire assembly to thereby form a partially coated conducting wire assembly, and annealing the partially coated conducting wire assembly by heating the partially coated conducting wire assembly to an annealing temperature and maintaining the annealing temperature for a predetermined period of time while applying tension to the partially coated conducting wire assembly.

The twisted conducting wire assembly may include at least one parallel portion, a left-wound portion, and a right-wound portion.

The cutting and stripping the insulation coating from the least one end portion of the shortened conducting wire assembly may expose at least one portion of the plurality of conducting wires.

The annealing may include heating the partially coated conducting wire assembly to raise a temperature of the partially coated conducting wire assembly to the annealing temperature by direct resistance heating.

The direct resistance heating may be performed by supplying a current to the at least one exposed portion of the plurality of conducting wires.

The annealing may include applying tension to the partially coated conducting wire assembly while both end portions of the partially coated conducting wire assembly are fixed such that an angle of twist from untwisting deformation is maintained within a range of predetermined angles.

The range of predetermined angles is between +2 degrees and −2 degrees.

An exemplary aspect of the present disclosure relates to a method of manufacturing a coated conducting wire assembly that includes bundling a plurality of conducting wires to thereby form a conducting wire bundle, twist-deforming the conducting wire bundle to thereby form a conducting wire assembly, covering the conducting wire assembly with an insulation coating to thereby form a coated conducting wire assembly, heating the coated conducting wire assembly to raise a temperature of the coated conducting wire assembly to an annealing temperature by direct resistance heating while applying tension to the coated conducting wire assembly, and annealing the coated conducting wire assembly by heating and holding the coated conducting wire assembly within a furnace at the annealing temperature while applying tension to the coated conducting wire assembly.

Tension may be applied to the coated conducting wire assembly while both end portions of the coated conducting wire assembly are fixed such that an angle of twist from untwisting deformation is maintained within a range of predetermined angles.

The range of predetermined angles is between +2 degrees and −2 degrees.

The present disclosure thus provides a method of manufacturing a coated conducting wire assembly that may correct twisting deformation.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 10 is a perspective view of a clamp unit used in the method of manufacturing the coated conducting wire assembly according to the exemplary embodiment of FIG. 1;

FIG. 13 is a perspective view of an example of a conducting wire assembly manufactured according to the method of manufacturing the coated conducting wire assembly according to the exemplary embodiment of FIG. 1;

FIG. 14 is a front view of the example of a conducting wire assembly of FIG. 13;

DETAILED DESCRIPTION OF EXEMPLARY EMBODIMENTS

Figure 1:
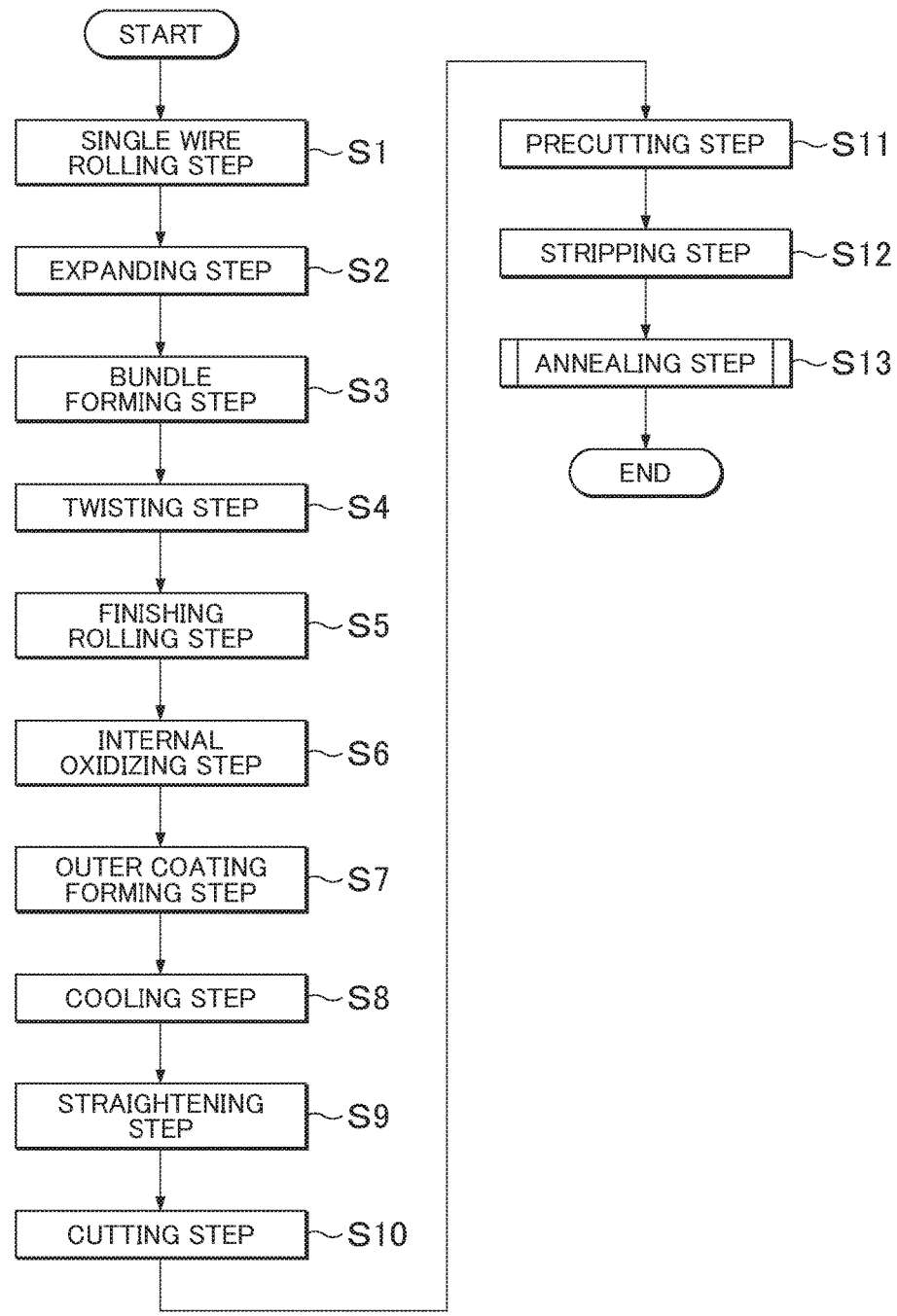
FIG. 1 is a flowchart illustrating a method of manufacturing a coated conducting wire assembly according to an exemplary embodiment.
Figure 2:
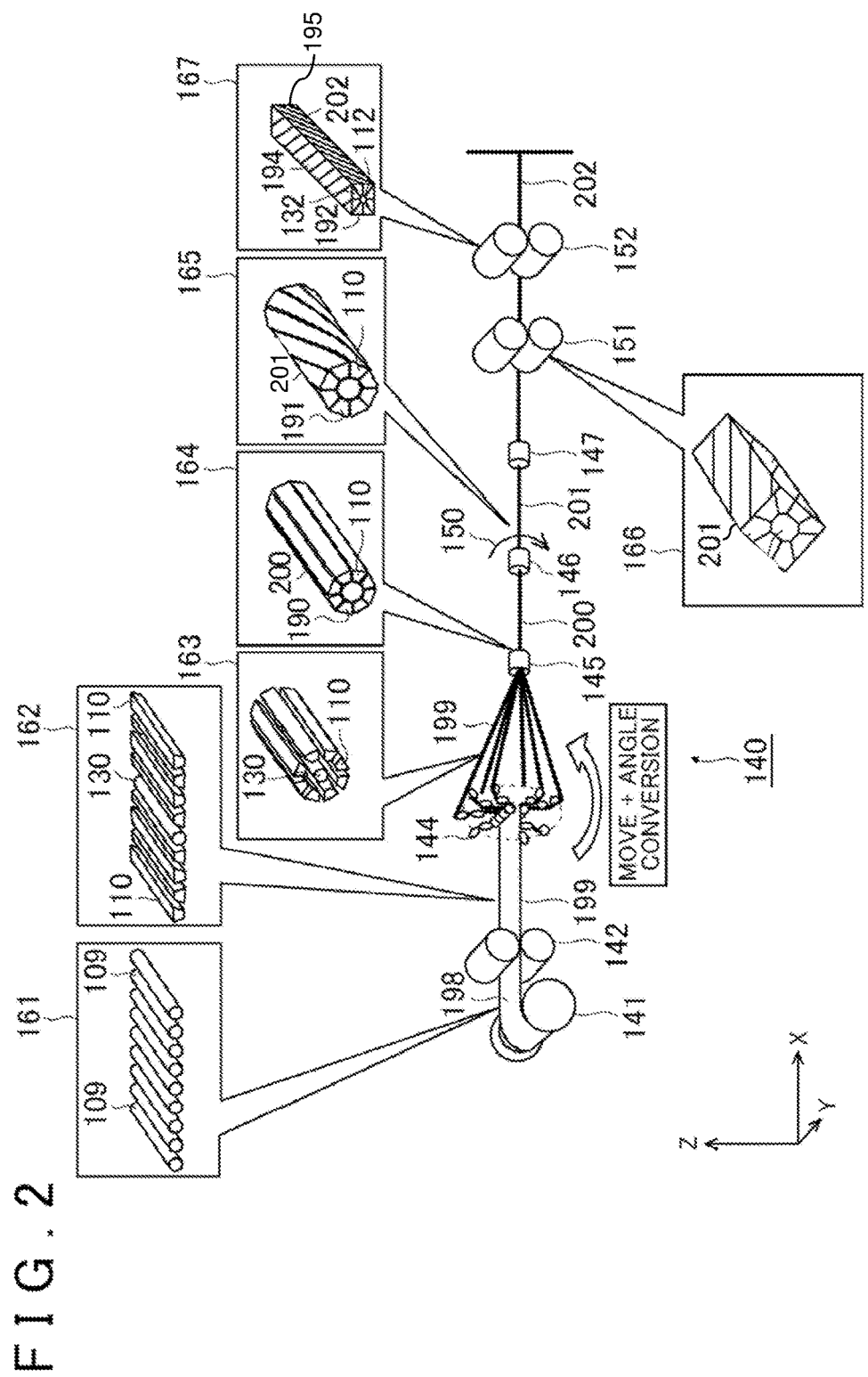
FIG. 2 is a view showing a frame format of a plurality of steps in the method of manufacturing the coated conducting wire assembly according to the exemplary embodiment of FIG. 1.

A method of manufacturing a coated conducting wire assembly according to an exemplary embodiment of the present disclosure will be described with reference to FIGS. 1-14. FIG. 1 is a flowchart illustrating the method of manufacturing a coated conducting wire assembly according to the present exemplary embodiment. FIG. 2 is a view showing a frame format of a plurality of steps of the method of manufacturing a coated conducting wire assembly according to the present exemplary embodiment. First, a plurality of steps to continuously manufacture an assembly conductor 202 from a conducting wire group 198 using a manufacturing apparatus 140 will be described. The conducting wire group 198 is shown in frame format 161 as comprising a plurality of conducting wires 109 arranged alongside one another in a Y direction of FIG. 2.

As shown in FIG. 2, a wire feeder 141 feeds the conducting wire group 198 into a first pressure roller 142. As shown in frame format 161, the conducting wires 109 are linear bodies that have generally circular cross-sections. The conducting wires 109 make up a portion of the conducting wire group 198 that form peripheral wires 110. The conducting wires 109 are made of material that conducts electricity, e.g., pure copper or a copper alloy among other examples.

The first pressure roller 142 receives the conducting wires 109 from the wire feeder 141, and plastic deforms the conducting wires 109 of the conducting wire group 198 as shown in frame format 162 to form the peripheral wires 110 (Single Wire Rolling Step S1 of FIG. 1). For example, the cross-section of the conducting wires 109 may be deformed from a generally circular cross-section having isotropy such that a shape of the cross-section does not change as the conducting wires 109 are rotated, to an anisotropically shaped cross-section having anisotropy such that a shape of the cross-section changes as the peripheral wires 110 are rotated. Among other anisotropic shapes, the cross-section of the peripheral wires 110 may be formed as a trapezoid in which the lengths of an upper base and a lower base are different. Examples of other anisotropic shapes include a fan shape, an arc shape, a triangle shape, and the like. A wire group 199 is shown in frame format 162 as comprising the peripheral wires 110 and a core wire 130 arranged alongside one another. In particular, the wires 110, 130 of the wire group 199 are arranged alongside one another in the Y direction of FIG. 2 perpendicular to a feeding direction of the wire group 199, i.e., the X direction of FIG. 2. More particularly, the peripheral wires 110 are arranged such that surfaces corresponding to an upper base, i.e. a short base, of the trapezoid cross-sections of the peripheral wires 110 are arranged alternately with surfaces corresponding to a lower base, i.e. a long base, of the trapezoid cross-sections.

The first pressure roller 142 includes a pair of rollers that may be rotated by a driving mechanism. The first pressure roller 142 feeds the wire group 199 to a transport device 144. As mentioned above, and as shown in frame format 162, the wires 110, 130 of the wire group 199 are arranged alongside one another in the Y direction of FIG. 2 perpendicular to a feeding direction of the wire group 199, i.e., the X direction of FIG. 2.

The transport device 144 receives the wire group 199 from the first pressure roller 142. The transport device 144 expands the wires of the wire group 199 to create a positional relationship in which the peripheral wires 110 are arranged around the core wire 130. More specifically, as shown in frame format 163, the peripheral wires 110 are arranged in an annular shape centered on the core wire 130 (Expanding Step S2 of FIG. 1). The peripheral wires 110 are arranged such that an area of an outer peripheral surface of each peripheral wire 110 is larger than an area of an inner peripheral surface of each peripheral wire 110. That is, the peripheral wires 110 are arranged around the core wire 130 such that the long base of the trapezoid cross-section of each peripheral wire 110 is arranged along an outer periphery and such the short base of the trapezoid cross-section of each peripheral wire 110 is arranged along an inner periphery.

The transport device 144 further arranges the peripheral wires 110 such that the inner peripheral surfaces, i.e., the short bases of the trapezoid cross-sections, of the peripheral wires 110 face the core wire 130. That is, the inner peripheral surfaces, i.e., the short bases of the trapezoid cross-sections, of the peripheral wires 110 generally follow the outer peripheral surface of the core wire 130. The core wire 130 has a generally circular cross-section. As such, the inner peripheral surfaces, i.e., the short bases of the trapezoid cross-sections, of the peripheral wires 110 are generally arranged perpendicular to a virtual line that extends radially outward from the core wire 130. The transport device 144 feeds the wire group 199 to a clamp 145.

The clamp 145 receives the wire group 199 from the transport device 144. The clamp 145 aligns the wire group 199, and arranges the peripheral wires 110 around the core wire 130 to form a bundled wire assembly, i.e., a wire assembly bundle 200 (Bundle Forming Step S3 of FIG. 1). The clamp 145 forms the wire assembly bundle 200 such that the inner peripheral surfaces, i.e., the short bases of the trapezoid cross-sections, of the peripheral wires 110 face the core wire 130.

The clamp 145 applies a predetermined pressure to the wire assembly bundle 200 in a direction toward the center of the wire assembly bundle 200. As a result, as shown in frame format 164, the peripheral wires 110 are brought closer to the core wire 130 in a cross-section 190 of the wire assembly bundle 200. In addition, the peripheral wires 110 are brought closer to one another in the cross-section 190 of the wire assembly bundle 200. The wire assembly bundle 200 passes through the clamp 145 and a rotator 146, and is then fed to a clamp 147.

Figure 3:
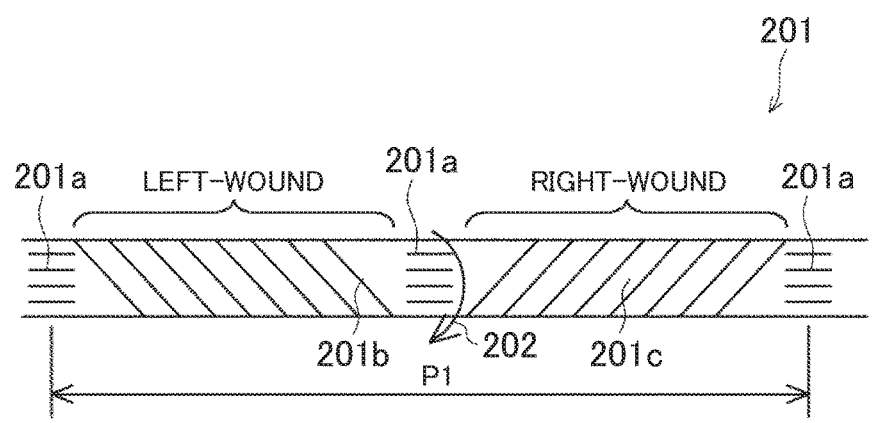
FIG. 3 is a view showing a frame format of the conducting wire assembly in one of the steps of the method of manufacturing the coated conducting wire assembly according to the exemplary embodiment of FIG. 1.

The clamp 145, the rotator 146, and the clamp 147 clamp the wire assembly bundle 200 and fix the axis of the wire assembly bundle 200. In particular, the rotator 146 rotates the wire assembly bundle 200 in a predetermined rotational direction 150 and twists the wire assembly bundle 200 (Twisting Step S4 of FIG. 1) while the clamp 145 and the clamp 147 remain clamped against the wire assembly bundle 200. As a result, a twisted assembly conductor 201 is formed. As shown in FIG. 3, the twisted assembly conductor 201 has a first twisted portion between the clamp 145 and the rotator 146 that is twisted in a spiral around the core wire 130 in a first direction, and a second twisted portion between the rotator 146 and the clamp 147 that is twisted in a spiral around the core wire 130 in a second direction opposite from the first direction of the first twisted portion, with the rotator 146 as the boundary between the first twisted portion and the second twisted portion. The twisted assembly conductor 201 may also have a non-twisted portion that runs parallel to the axis of the core wire 130, between the first twisted portion and the second twisted portion. In particular, the twisted assembly conductor 201 has a parallel portion 201a, a left-wound portion 201b, and a right-wound portion 201c, as shown in FIG. 3. It should be appreciated that FIG. 3 is a view of a frame format showing the coated conducting wire assembly in one step of the method of manufacturing the coated conducting wire assembly according to the present exemplary embodiment. The parallel portion 201a, the left-wound portion 201b, and the right-wound portion 201c are arranged in order of the parallel portion 201a, the left-wound portion 201b, the parallel portion 201a, the right-wound portion 201c, and the parallel portion 201a, in the feeding direction of the twisted assembly conductor 201, i.e., in the X direction of FIG. 3. The parallel portion 201a, the left-wound portion 201b, the parallel portion 201a, the right-wound portion 201c, and the parallel portion 201a, are formed after the Twisting Step S4 is performed once. In the present exemplary embodiment, the parallel portion 201a, the left-wound portion 201b, the parallel portion 201a, the right-wound portion 201c, and the parallel portion 201a equal a length P1 (pitch).

As shown in frame format 165 of FIG. 2, the twisted assembly conductor 201 is an assembly conductor in which the core wire 130 and the peripheral wires 110 are aligned. The rotator 146 is able to form the cross-section 191 in which the generally circular shape of the cross-section 190 is maintained.

The clamp 147 applies a predetermined pressure to the twisted assembly conductor 201, in a direction toward the center of the twisted assembly conductor 201. As a result, the core wire 130 is brought into close contact with the peripheral wires 110, and the peripheral wires 110 are brought into close contact with one another.

A second pressure roller 151 receives the twisted assembly conductor 201 from the clamp 147. The second pressure roller 151 includes a pair of rollers that may be rotated by a driving mechanism. The second pressure roller 151 applies pressure to the twisted assembly conductor 201 in a vertical direction, i.e., the Z direction of FIG. 2, to thereby deform the twisted assembly conductor 201 into a generally flat shape as shown in frame format 166. A third pressure roller 152 receives the twisted assembly conductor 201 from the second pressure roller 151. The third pressure roller 152 forms a pair of outer wall surfaces 194 in a width direction, i.e., the Y direction of FIG. 2, on an upper surface and a lower surface of the twisted assembly conductor 201 as shown in frame format 167 (Finishing Rolling Step S5 of FIG. 1). As a result, an assembly conductor 202, having a cross-section 192 having a generally rectangular shape, is formed. A pair of outer wall surfaces 195 in the vertical direction, i.e., the Z direction of FIG. 2, may also be formed on opposing side surfaces of the assembly conductor 202 using at least one of the pressure rollers 151, 152, as necessary. The assembly conductor 202 has a core wire 132 and peripheral wires 112.

Figure 4:
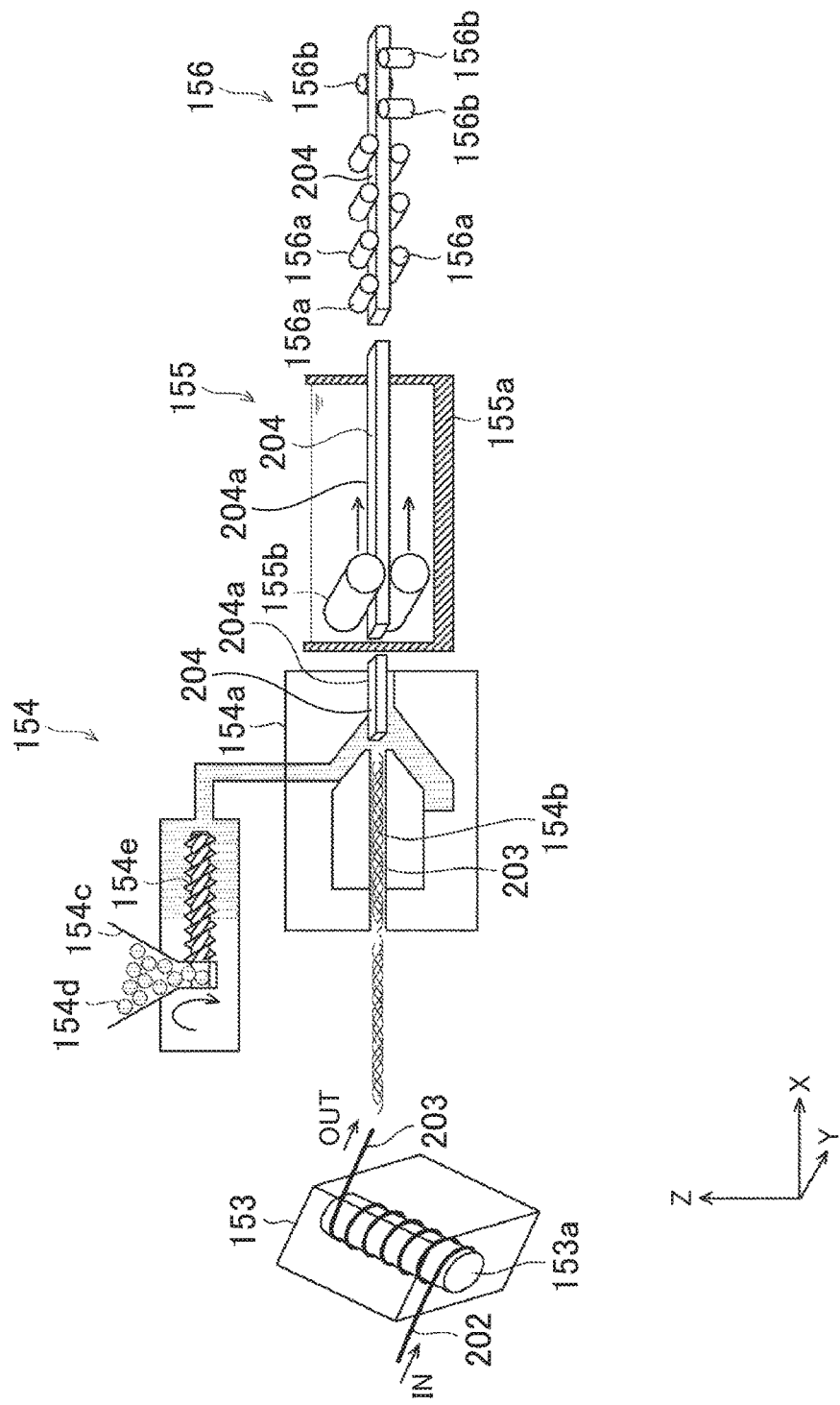
FIG. 4 is a view showing a frame format of a plurality of steps of the method of manufacturing the coated conducting wire assembly according to the exemplary embodiment of FIG. 1.

As shown in FIG. 4, an oxidation furnace 153 receives the assembly conductor 202 from the third pressure roller 152 (see FIG. 2). FIG. 4 is a view showing a frame format of a plurality of steps in the method of manufacturing the coated conducting wire assembly according to the present exemplary embodiment. The assembly conductor 202 is wound on a winding roller 153a inside the oxidation furnace 153. An oxide film is formed inside the assembly conductor 202, i.e., between the core wire 132 (see FIG. 2) and the peripheral wires 112 (see FIG. 2), as well as between the peripheral wires 112, by heating the assembly conductor 202 to an internal oxidization temperature within the oxidation furnace 153 (Internal Oxidizing Step S6 of FIG. 1). As a result, an assembly conductor 203 is formed. The oxide film may electrically insulate the core wire 132 from the peripheral wires 112, as well as electrically insulate the peripheral wires 112 from one another. An oxide film forming agent that forms an oxide film may be applied to the assembly conductor 202 before the Internal Oxidizing Step S6.

An insulation coating 204a is coated onto the assembly conductor 203 to form an externally coated conducting wire assembly 204 (Outer Coating Forming Step S7 of FIG. 1). In particular, an insulation coating applying device 154 receives the assembly conductor 203. The assembly conductor 203 is led into a die hole 154b of a drawing die 154a. The insulation coating applying device 154 softens a powder-like raw material 154d, filled into a hopper 154c, by heating the raw material 154d. The insulation coating applying device 154 then injects the softened raw material 154d into the die hole 154b of the drawing die 154a. The insulation coating applying device 154 applies pressure using a screw 154e. The assembly conductor 203 is then drawn through thee die hole 154b toward the downstream side of the die hole 154b. As a result, the externally coated conducting wire assembly 204 is formed and drawn from the die hole 154b of the drawing die 154a, with the insulation coating 204a formed on an outer peripheral surface of the assembly conductor 203.

The insulation coating 204a may be made of material having electrical insulating properties. Some examples of such a material are PFA (tetrafluoroethylene perfluoroalkyl vinyl ether copolymer), PEEK (polyether ether ketone), PPS (polyphenylene sulfide), enamel, and the like. Untwisting deformation or twisting deformation may occur in the externally coated conducting wire assembly 204 due to heating and tension being applied in the Outer Coating Forming Step S7.

The externally coated conducting wire assembly 204 is cooled to a predetermined temperature (Cooling Step S8 of FIG. 1). In particular, a cooling apparatus 155 receives the externally coated conducting wire assembly 204. The cooling apparatus 155 includes a tank 155a that holds a cooling liquid such as water. The cooling apparatus 155 further includes a pair of rollers 155b provided in the tank 155a. The cooling apparatus 155 passes the externally coated conducting wire assembly 204 between the pair of rollers 155b. As a result, the externally coated conducting wire assembly 204 is immersed within the cooling liquid inside the tank 155a and is thus cooled.

Pressure is applied to the externally coated conducting wire assembly 204 to increase the straightness of the externally coated conducting wire assembly 204 (Straightening Step S9 of FIG. 1). In particular, the externally coated conducting wire assembly 204 is fed through a plurality of rollers 156 including a first plurality of rollers 156a and a second plurality of rollers 156b that are lined up in a direction substantially perpendicular to the axis of the externally coated conducting wire assembly 204. The first plurality of rollers 156a and the second plurality of rollers 156b apply pressure to the externally coated conducting wire assembly 204. The direction in which this pressure is applied is a direction that is substantially perpendicular to the axis of the externally coated conducting wire assembly 204. The direction in which the first plurality of rollers 156a is lined up may also be substantially perpendicular to the direction in which the second plurality of rollers 156b is lined up.

Figure 5:
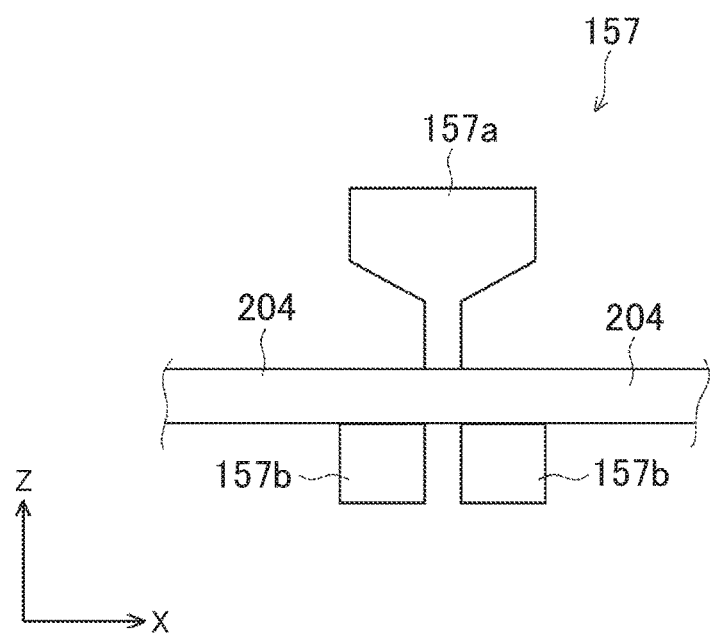
FIG. 5 is a view showing a frame format of one of the steps of the method of manufacturing the coated conducting wire assembly according to the exemplary embodiment of FIG. 1.
Figure 6:
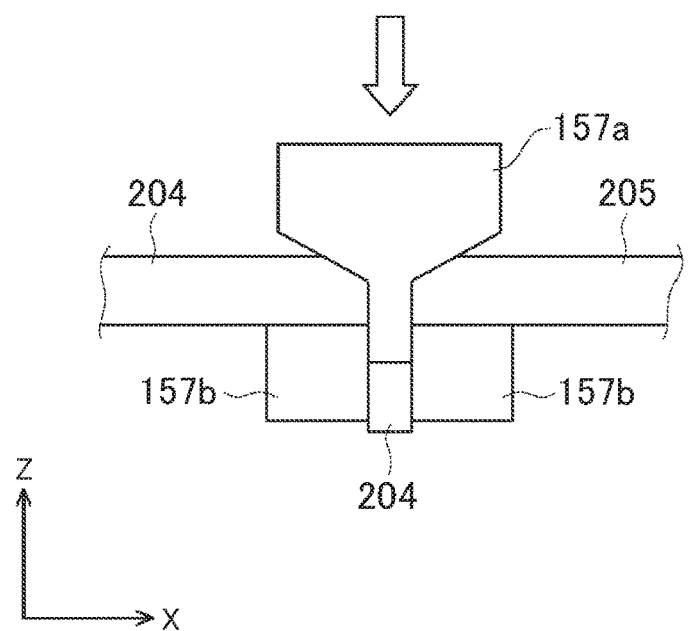
FIG. 6 is a view showing a frame format of one of the steps of the method of manufacturing the coated conducting wire assembly according to the exemplary embodiment of FIG. 1.

As shown in FIGS. 5 and 6, the externally coated conducting wire assembly 204 is cut using a press 157 (Cutting Step S10 of FIG. 1). FIGS. 5-8 are views showing frame formats of steps in the method of manufacturing the coated conducting wire assembly according to the present exemplary embodiment. In particular, a die 157b is provided below the externally coated conducting wire assembly 204, and the externally coated conducting wire assembly 204 is cut shorter by lowering a punch 157a from above the externally coated conducting wire assembly 204. As a result, a shortened conducting wire assembly 205 is formed. The length of this shortened conducting wire assembly 205 may be determined according to the usage application of the coated conducting wire assembly. For example, when the usage application of the coated conducting wire assembly is a short coil for a motor, which will be described later, the length of the shortened conducting wire assembly 205 may be determined according to the length of the short coil. Also, the length of the shortened conducting wire assembly 205 may be determined according to the size of manufacturing equipment such as an annealing furnace 40 that will be described later, or a clamp unit 20 that will also described later.

Figure 7:
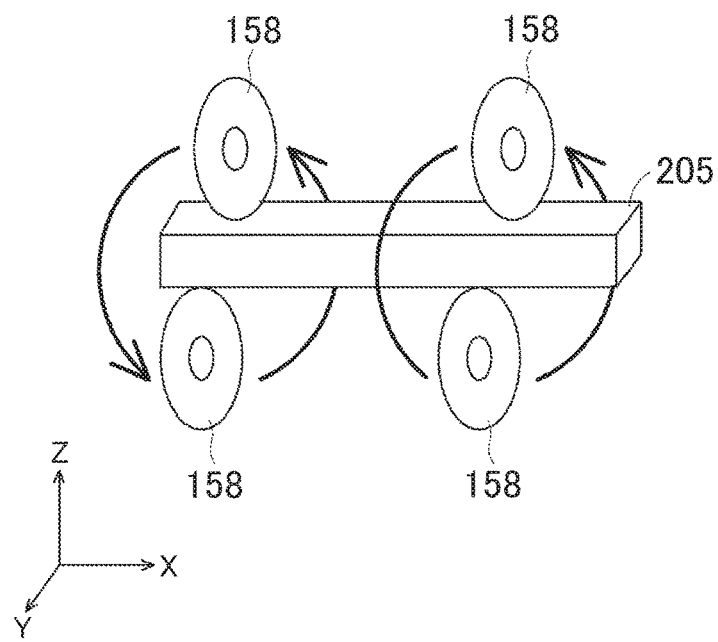
FIG. 7 is a view showing a frame format of one of the steps of the method of manufacturing the coated conducting wire assembly according to the exemplary embodiment of FIG. 1.

As shown in FIG. 7, both end portions of an outer coating 205a of the shortened conducting wire assembly 205 are cut using a disk-shaped cutter 158 (Precutting Step S11 of FIG. 1). While both end portions of the outer coating 205a are cut, conducting wire, not shown, of the shortened conducting wire assembly 205 is not cut, so the conducting wire, not shown, of the short conducting wire assembly 205 is not damaged.

Figure 8:
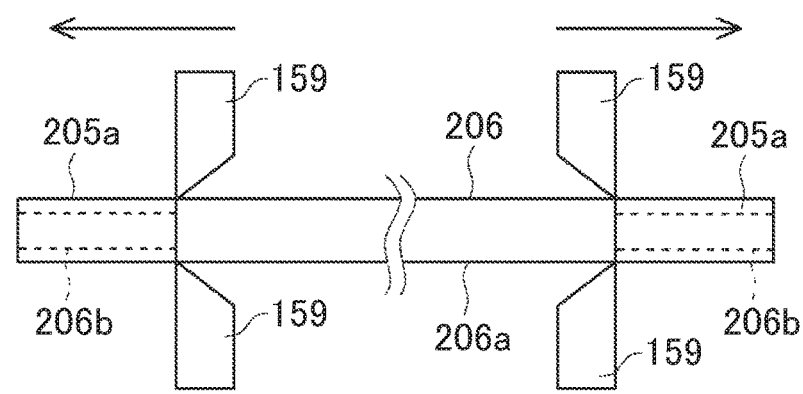
FIG. 8 is a view showing a frame format of one of the steps of the method of manufacturing the coated conducting wire assembly according to the exemplary embodiment of FIG. 1.

As shown in FIG. 8, both end portions of the outer coating 205a are stripped, i.e., removed, using a blade 159, such that a partially coated conducting wire assembly 206 is formed (Stripping Step S12 of FIG. 1). In particular, both end portions of the cut outer coating 205a are stripped by inserting the blade 159 into the outer coating 205a and moving the blade 159 toward the ends of the shortened conducting wire assembly 205. The partially coated conducting wire assembly 206 includes an insulation coating 206a, and a conducting wire assembly 206b that is covered by the insulation coating 206a. At least the center portion of the conducting wire assembly 206b remains covered by the insulation coating 206a, and is thus electrically insulated. Both end portions (also referred to simply as "conducting portions") of the conducting wire assembly 206b are not covered by the insulation coating 206a and are thus exposed and able to conduct electricity.

The partially coated conducting wire assembly 206 is heated until it reaches an annealing temperature while tension is applied, and this temperature is maintained for a predetermined period of time (Annealing Step S13 of FIG. 1).

Figure 9:
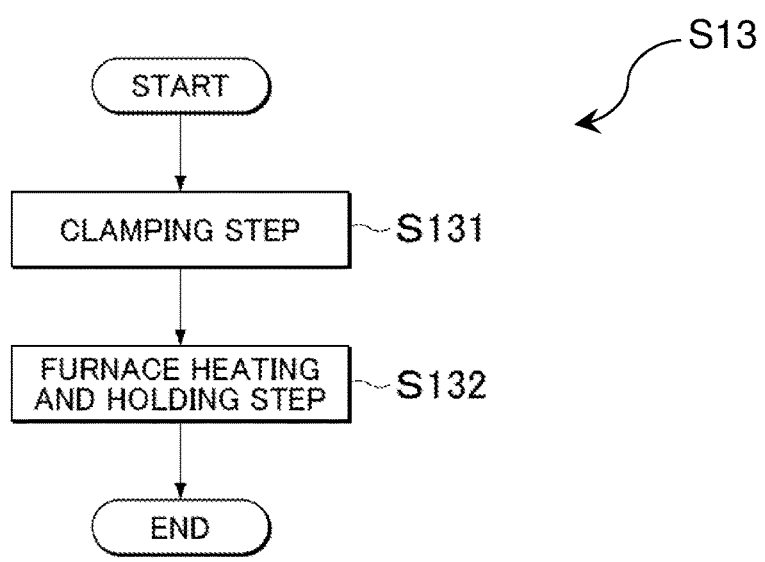
FIG. 9 is a flowchart illustrating a plurality of steps of the method of manufacturing the coated conducting wire assembly according to the exemplary embodiment of FIG. 1.
Figure 11:
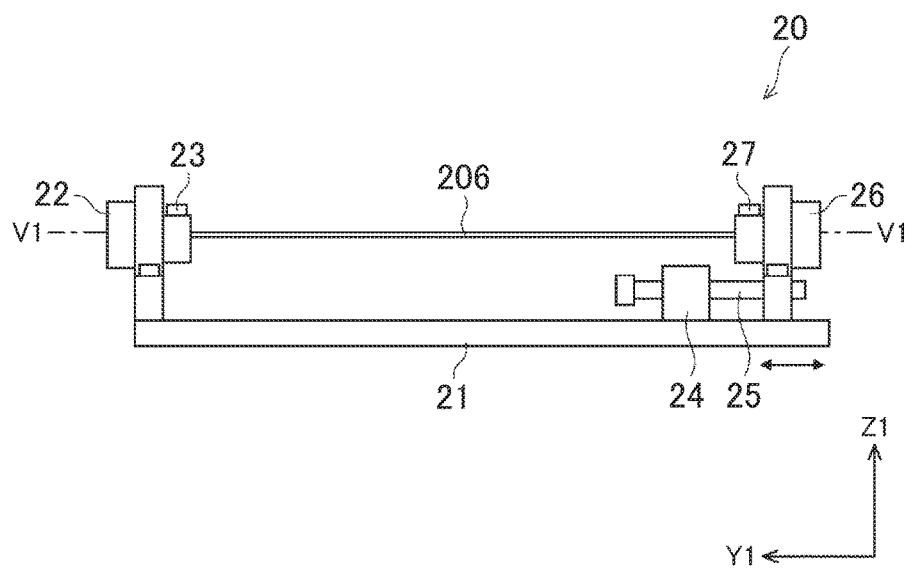
FIG. 11 is a front view of the clamp unit of FIG. 10.
Figure 12:
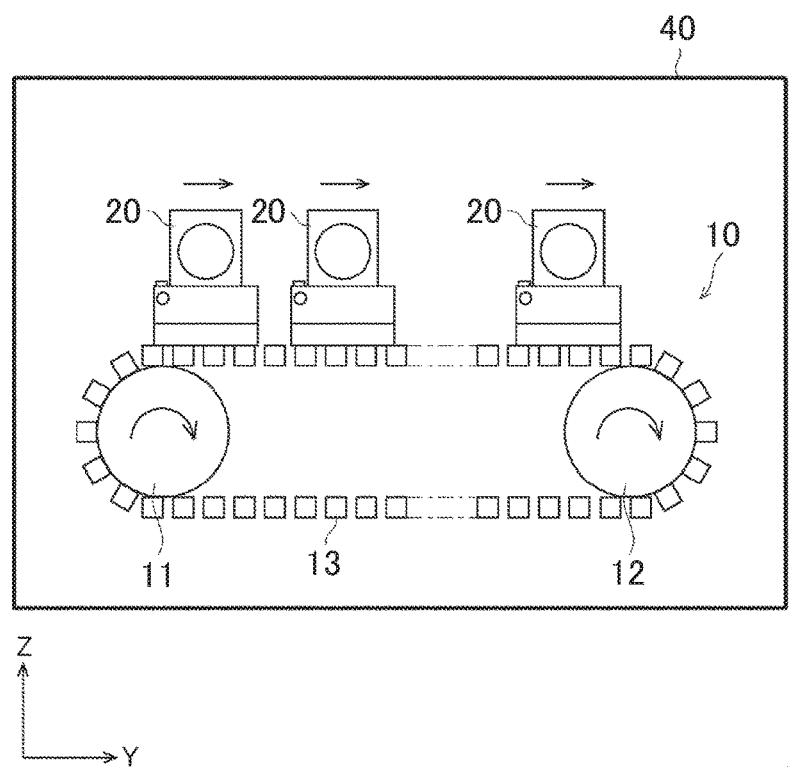
FIG. 12 is a view showing a frame format of one of the steps of the method of manufacturing the coated conducting wire assembly according to the exemplary embodiment of FIG. 1.

In particular, as shown in FIGS. 9-12, while the partially coated conducting wire assembly 206 is clamped by the clamp unit 20, the clamp unit 20, including the partially coated conducting wire assembly 206, is put into the annealing furnace 40, then heated to a predetermined temperature and kept at this temperature for a predetermined period of time. FIG. 9 is a flowchart illustrating steps in the method of manufacturing the coated conducting wire assembly according to the present exemplary embodiment. FIG. 10 is a perspective view of the clamp unit 20 used in the method of manufacturing the coated conducting wire assembly according to the present exemplary embodiment. FIG. 11 is a front view of the clamp unit 20 used in the method of manufacturing the coated conducting wire assembly according to the present exemplary embodiment. FIG. 12 is a view showing a frame format of a step in the method of manufacturing the coated conducting wire assembly according to the present exemplary embodiment.

As shown in FIGS. 10 and 11, the clamp unit 20 includes a base 21, a clamp supporting portion 22, a clamp 23, a spring supporting portion 24, a rod 25, a clamp supporting portion 26, and a clamp 27. The base 21 is a rectangular plate-like body, and the clamp supporting portion 22 is a block-shaped body provided on a first end of the base 21. The spring supporting portion 24 is a block-shaped body provided on a second end of the base 21. The rod 25 is slidably inserted into the spring supporting portion 24. The rod 25 is biased via a spring in a direction away from the clamp 23. The clamp supporting portion 26 is connected to the rod 25 and is slidable relative to the spring supporting portion 24. The clamp 27 is supported by the clamp supporting portion 26.

The clamp 23 and the clamp 27 are arranged facing each other on the same virtual axis V1. When the clamp supporting portion 26 moves, the clamp 27 moves along the virtual axis V1. The virtual axis V1 may be substantially parallel to an upper surface of the base 21. The clamp 23 and the clamp 27 are, to be more precise, fixing implements, e.g., chuck devices, that fix the partially coated conducting wire assembly 206 in a predetermined position by clamping it.

Tension is applied to the partially coated conducting wire assembly 206 using the clamp unit 20 (Clamping Step S131 of FIG. 9). In particular, the clamp unit 20 is able to clamp the partially coated conducting wire assembly 206 by clamping one end portion of the partially coated conducting wire assembly 206 with the clamp 23, while clamping the other end portion of the partially coated conducting wire assembly 206 with the clamp 27. The rod 25 and the clamp supporting portion 26 are biased by the restoring force of the spring, and the clamp 27 is pushed in a direction away from the clamp 23. As a result, tension is applied the partially coated conducting wire assembly 206 along the virtual axis V1. The end portion of the partially coated conducting wire assembly 206 clamped by clamp 27 may be kept from twisting, so as to correct untwisting deformation or twisting deformation that may occur in the Outer Coating Forming Step S7 or the like, with respect to the end portion of the partially coated conducting wire assembly 206 clamped by clamp 23. The phrase "kept from twisting" means that the twisting angle, i.e., the angle of the end portion of the partially coated conducting wire assembly 206 clamped by clamp 27 with respect to the end portion of the partially coated conducting wire assembly 206 clamped by clamp 23, is essentially 0° (zero degrees).

Annealing is performed by heating and holding the partially coated conducting wire assembly 206 (Furnace Heating and Holding Step S132 of FIG. 9). Annealing is not limited to annealing but may include other typical heating treatments. As shown in FIG. 12, the clamp unit 20, including the partially coated conducting wire assembly 206, is placed on a conveyer 10 arranged inside the annealing furnace 40. A plurality of clamp units 20 are arranged such that the axes of the partially coated conducting wire assemblies 206 are arranged along the width direction of the conveyer 10 and thus aligned along a moving direction of the conveyer 10. That is, the partially coated conducting wire assemblies 206 may be arranged in a line. The annealing furnace 40 is able to heat an object arranged inside a furnace chamber of the annealing furnace 40 by emitting infrared radiation or generating heated air, for example. After the partially coated conducting wire assembly 206 is heated to the annealing temperature by the annealing furnace 40, the conveyer 10 rotates rotating rollers 11, 12 in the same direction to move a belt 13 while maintaining the annealing temperature. As a result, a plurality of clamp units 20 is able to pass through the annealing furnace 40. As such, annealing is able to be applied continuously to the plurality of partially coated conducting wire assemblies 206. Because the partially coated conducting wire assemblies 206 that have been shortened by the cutting step S10 are arranged in a line, annealing is able to be performed using the compact full length of the annealing furnace in the moving direction of the conveyer 10. The adhesion strength between the insulation coating 206a and the conducting wire assembly 206b is able to be increased by annealing. In the present exemplary embodiment, the partially coated conducting wire assembly 206 is shorter than the externally coated conducting wire assembly 204 (see FIGS. 4-6), as such, the partially coated conducting wire assembly 206 is easy to maneuver. As discussed above, heating treatment is able to be performed on each partially coated conducting wire assembly 206 in a manner such that a heating apparatus, such as the annealing furnace 40, is able to be smaller. In addition, tension may be applied individually to the partially coated conducting wire assemblies 206 as discussed above; as such the applied tension is able to be reduced. Therefore, a tensioning device that applies the tension to the partially coated conducting wire assemblies 206, e.g., the clamp units 20, is able to be smaller.

Among other examples, the conducting wire assembly 206b may include copper wire made of copper or a copper alloy, and a copper oxide film made of copper oxide that covers this copper wire. When annealing is performed, the copper oxide film of the conducting wire assembly 206b and the insulation coating 206a that may be made of resin into which LCP (liquid crystal polymer) has been blended are bonded by a hydrogen bond.

The adhesion strength between the insulation coating 206a and the conducting wire assembly 206b may be increased by heating and holding the partially coated conducting wire assembly 206, while inhibiting twisting by applying tension to the partially coated conducting wire assembly 206.

Figure 23:
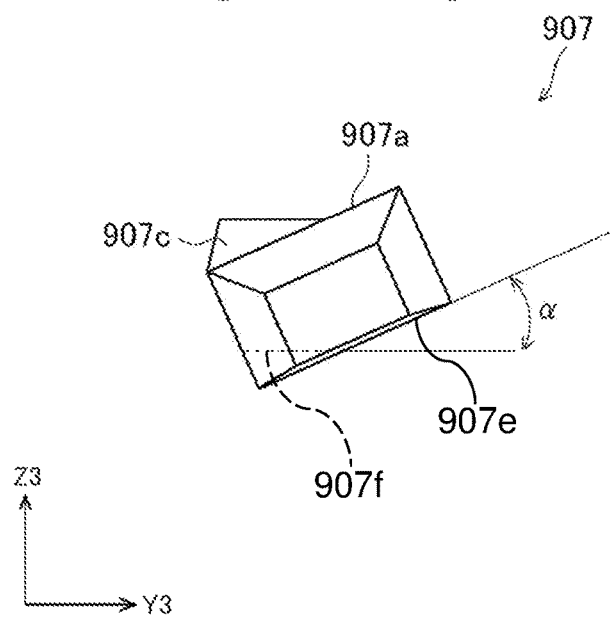
FIG. 23 is a front view of the example of a conducting wire assembly of FIG. 22.

By performing the steps described above, a conducting wire assembly 207 may be manufactured. FIGS. 13 and 14 are views showing an exemplary embodiment of the conducting wire assembly 207 manufactured using the method of manufacturing the coated conducting wire assembly according to the present exemplary embodiment. In FIGS. 13 and 14, the conducting wire assembly 207 is shown as a single conducting wire in order to facilitate understanding. As shown in FIG. 13, the conducting wire assembly 207 has a first end portion 207a and a second end portion 207c. The first end portion 207a has a side surface 207e, and the second end portion 207c has a side surface 207f. As shown in FIG. 14, a twisting angle β formed by the side surface 207e and the side surface 207f intersecting each other is smaller than an angle α (see FIG. 23), and falls within a range of suitable values for the coated conducting wire assembly as will be described in more detail below. In the present exemplary embodiment, the twisting angle β is shown as being essentially 0° (zero degrees). That is, any twisting deformation of the conducting wire assembly 207 that may occur in the Outer Coating Forming Step S7 may be able to be corrected because such that the twisting angle β of the conducting wire assembly 207 is sufficiently small.

The method of manufacturing the coated conducting wire assembly according to the present exemplary embodiment described above thus makes it possible to manufacture a coated conducting wire assembly in which twisting deformation may be corrected.

A motor may be formed using the obtained conducting wire assembly 207. In particular, after the conducting wire assembly has been cooled, using an air blower for example, short coil wires, not shown, that are curved in a general U-shape or a general C-shape for example, are formed by press forming. Then, after being inserted into slots in a stator main body, the short coil wires are extended. The end portions of the shortened coil wires are welded together to form a coil. A motor is then able to be formed by arranging the formed coil on, for example, a stator, and the like. The twisting deformation of the conducting wire assembly 207 is sufficiently small, so the conducting wire assembly 207 is able to be efficiently assembled to the stator main body or the like with sufficient accuracy. As a result, a motor in which the conducting wire assembly 207 is assembled with sufficient accuracy is able to be manufactured. This kind of motor may be used in a vehicle such as a hybrid vehicle or a robot, for example.

Figure 15:
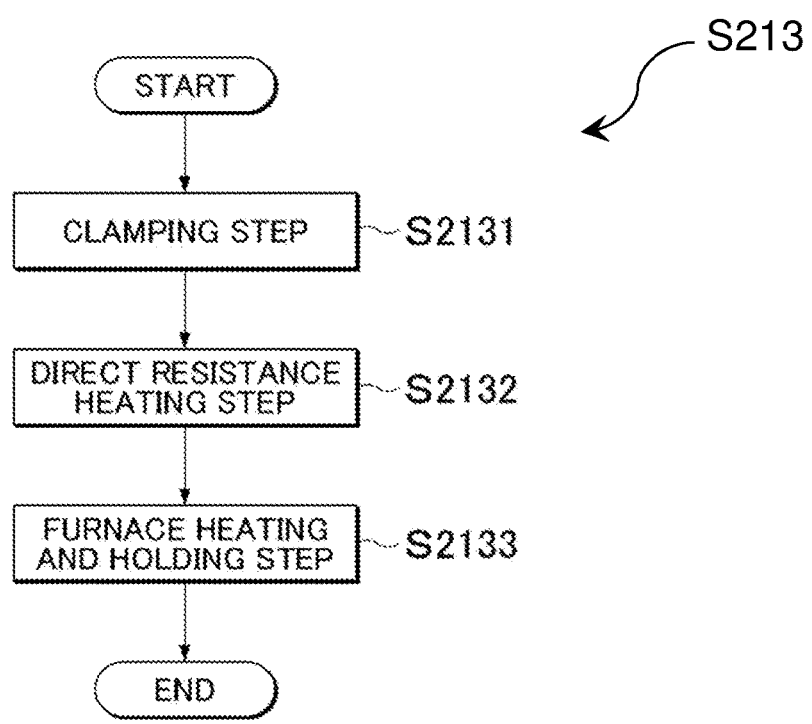
FIG. 15 is a flowchart illustrating steps of a method of manufacturing a coated conducting wire assembly according to an exemplary embodiment.
Figure 16:
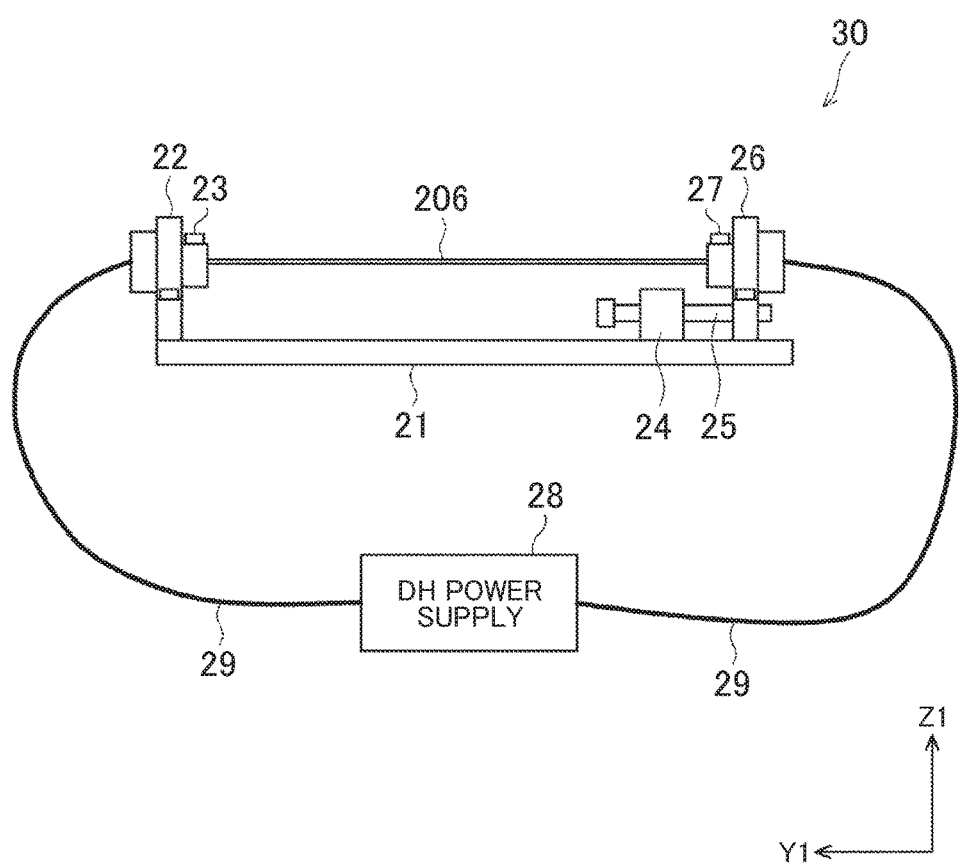
FIG. 16 is a front view of a clamp unit used in the method of manufacturing the coated conducting wire assembly according to the exemplary embodiment of FIG. 15.
Figure 17:
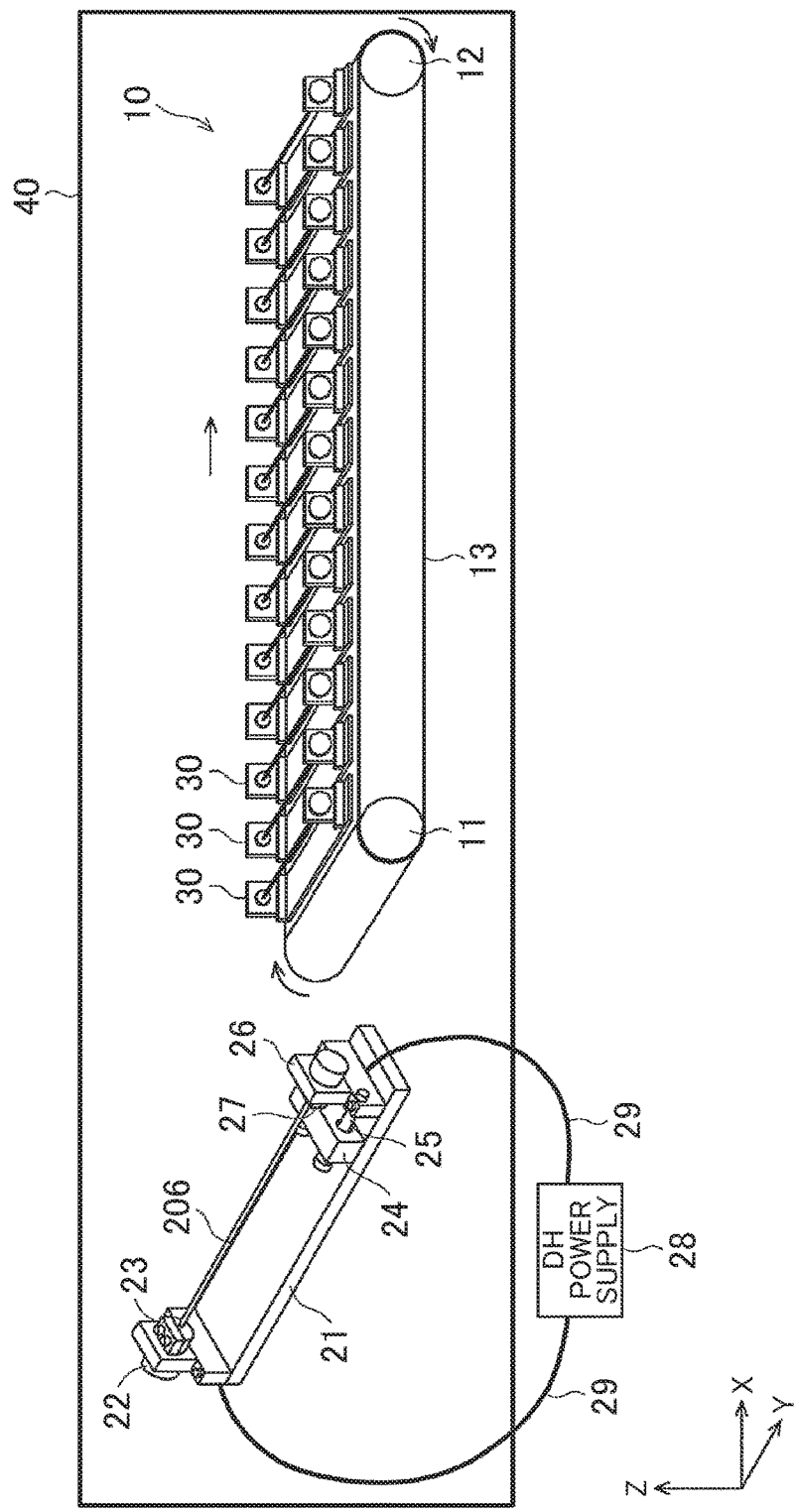
FIG. 17 is a view showing a frame format of one of the steps of the method of manufacturing the coated conducting wire assembly according to the exemplary embodiment of FIG. 15.

A method of manufacturing a coated conducting wire assembly according to an exemplary embodiment of the present disclosure will be described with reference to FIGS. 15-17. FIG. 15 is a flowchart illustrating steps of the method of manufacturing the coated conducting wire assembly according to the present exemplary embodiment. FIG. 16 is a front view of a clamp unit used in one of the steps of the method of manufacturing the coated conducting wire assembly according to the present exemplary embodiment. FIG. 17 is a view showing a frame format of one of the steps of the method of manufacturing the coated conducting wire assembly according to the present exemplary embodiment. The method of manufacturing the coated conducting wire assembly according to the present exemplary embodiment has the same steps as the manufacturing method of the coated conducting wire assembly according to the exemplary embodiment described above with reference to FIGS. 1-14, except that an Annealing Step S213 is performed instead of the Annealing Step S13.

In the present exemplary embodiment, the steps shown in FIG. 1 from the Single Wire Rolling Step S1 to the Stripping Step S12 are performed just as they are in the method of manufacturing the coated conducting wire assembly according to the exemplary embodiment described above with reference to FIGS. 1-14.

The partially coated conducting wire assembly 206 formed after Stripping Step S12, is heated to the annealing temperature while tension is applied, and is then kept at this annealing temperature for a predetermined period of time (Annealing Step S213 of FIG. 15).

In particular, as shown in FIG. 16, tension is applied to the partially coated conducting wire assembly 206 using a clamp unit 30 (Clamping Step S2131 of FIG. 15). The clamp unit 30 has the same structure as the clamp unit 20, except that it includes a direct-resistance heating (DH) power supply 28 and a conducting wire 29. The DH power supply 28 of the clamp unit 30 is detachably connected to the clamps 23, 27 via the clamp supporting portions 22, 26, and the conducting wire 29. The conducting wire 29 is electrically connected to both end portions of the partially coated conducting wire assembly 206. The DH power supply 28 supplies current to the partially coated conducting wire assembly 206 via the conducting wire 29. Tension is applied to the partially coated conducting wire assembly 206 by clamping both end portions of the partially coated conducting wire assembly 206 within the clamps 23, 27 of the clamp unit 30, just as in the Clamping Step S131 of FIG. 9.

The partially coated conducting wire assembly 206 is heated by direct resistance heating (Direct Resistance Heating Step S2132 of FIG. 15). In particular, current is supplied to the partially coated conducting wire assembly 206 by the DH power supply 28, and Joule heat is generated inside the partially coated conducting wire assembly 206, e.g., in the conducting wire assembly 206b. As a result, the temperature of the partially coated conducting wire assembly 206 rises to the annealing temperature or close thereto. When heating is performed from outside the partially coated conducting wire assembly 206, as with heating by the annealing furnace 40 (see FIG. 12) during the Furnace Heating and Holding Step S132 described above, the insulation coating 206a may act as a thermal insulator. As a result, heat may not be effectively transmitted to the contact portion between the conducting wire assembly 206b and the insulation coating 206a. When heating by direct resistance heating in the Direct Resistance Heating Step S2132, a tremendous amount of heat may be generated in a short period of time in the object to be heated, i.e., the partially coated conducting wire assembly 206, compared to when heating by the annealing furnace 40 (see FIG. 12) in the Furnace Heating and Holding Step S132. Therefore, the temperature of the partially coated conducting wire assembly 206 may be raised to the annealing temperature in a short period of time. The Direct Resistance Heating Step S2132 may be performed inside the furnace chamber of the annealing furnace 40 or outside the furnace chamber of the annealing furnace 40.

Finally, as shown in FIG. 17, the clamp unit 30, including the partially coated conducting wire assembly 206, is put into the annealing furnace 40, and then heated and held (Furnace Heating and Holding Step S2133). In particular, the DH power supply 28 and the conducting wire 29 are removed from the clamp supporting portions 22, 26. Then, the clamp unit 30, including the partially coated conducting wire assembly 206, is placed on the conveyer 10 that is arranged inside the annealing furnace 40, similar to the Furnace Heating and Holding Step S132. The conveyer 10 rotates the rotating rollers 11, 12 in the same direction to move the belt 13, while the partially coated conducting wire assembly 206 is kept at the annealing temperature by the annealing furnace 40. As a result, a plurality of the clamp units 30 are able to pass through the annealing furnace 40, so annealing is able to be applied continuously to a plurality of partially coated conducting wire assemblies 206. In some exemplary embodiments, the clamp unit 30, including the partially coated conducting wire assembly 206, may be placed on the conveyer 10 while the DH power supply 28 and the conducting wire 29 are attached to the clamp supporting portions 22, 26, as necessary.

Upon completion of the Direct Resistance Heating Step S2132, the end portions of the partially coated conducting wire assembly 206 are often at lower temperatures because the end portions tend not to rise in temperature as easily as other portions of the partially coated conducting wire assembly 206. One reason for this is that the heat capacity of the clamp supporting portions 22, 26 and the clamps 23, 27 may be larger than the heat capacity of the partially coated conducting wire assembly 206. In the Furnace Heating and Holding Step S2133, the annealing furnace 40 heats the partially coated conducting wire assembly 206 and the clamp unit 30 evenly, so every portion of the partially coated conducting wire assembly 206 is able to be evenly heated and held.

According to the method of manufacturing the coated conducting wire assembly according to the present exemplary embodiment described above, a coated conducting wire assembly in which twisting deformation has been corrected is able to be manufactured efficiently by, among other things, raising the temperature to the annealing temperature by direct resistance heating.

EXAMPLES

Figure 18:
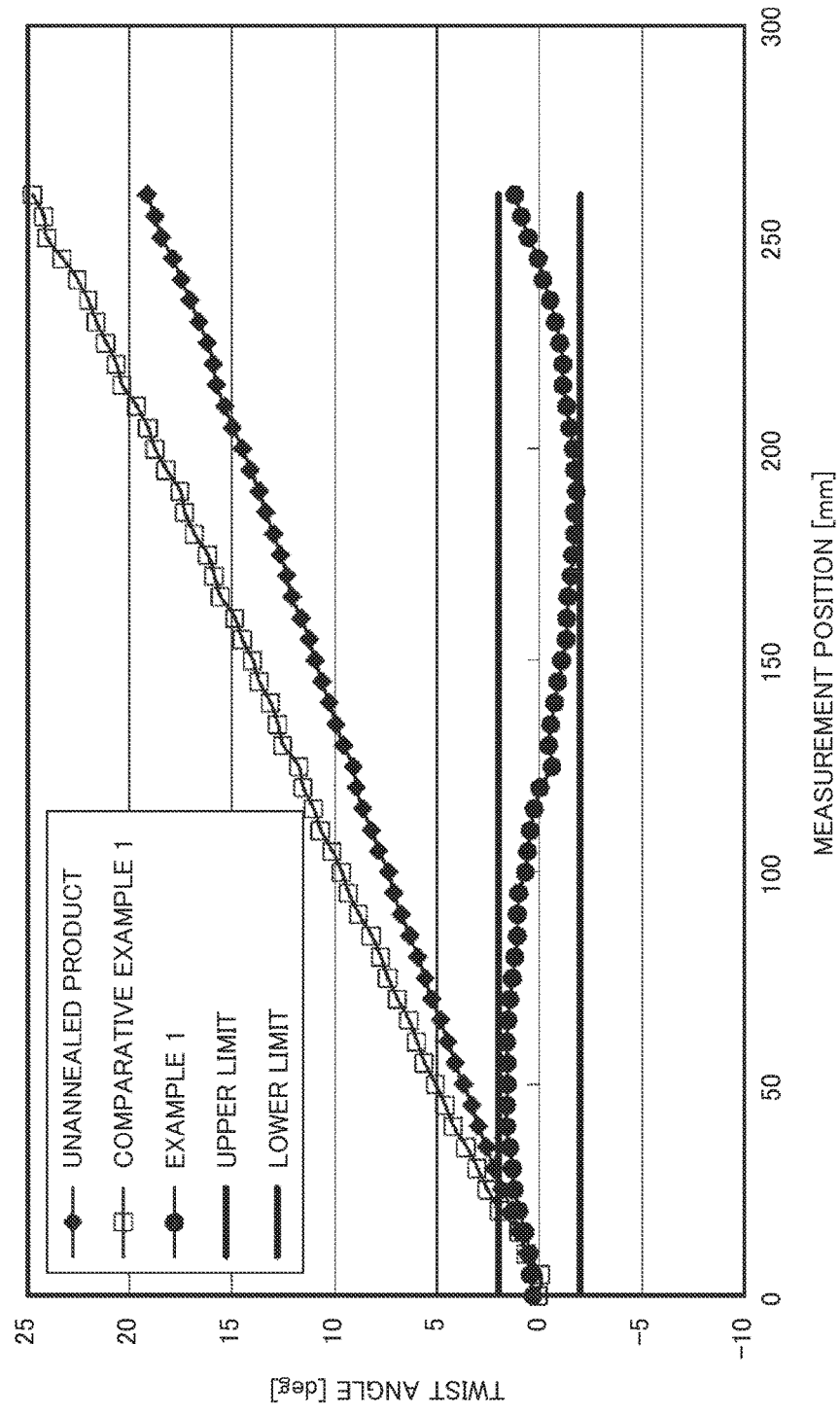
FIG. 18 is a graph showing a twisting angle with respect to a measurement position.

Next, examples in which conducting wire assemblies were manufactured using the method of manufacturing the coated conducting wire assembly according to the exemplary embodiment described above with reference to FIGS. 1-14 will be described with reference to FIG. 18. FIG. 18 is a graph showing the twisting angle with respect to a measurement position.

In Example 1, a conducting wire assembly was manufactured using the method of manufacturing the coated conducting wire assembly according to the exemplary embodiment described above with reference to FIGS. 1-14. In Comparative Example 1, a conducting wire assembly was manufactured using a manufacturing method having the same steps as the method of manufacturing the coated conducting wire assembly according to the exemplary embodiment described above with reference to FIGS. 1-14, except for the Annealing Step S13. More specifically, in a step in the Comparative Example 1, that corresponds to the Annealing Step S13, annealing was performed by heating and holding the conducting wire assembly using an annealing furnace, without applying tension to the conducting wire assembly using a clamp unit or the like.

In Example 1, the twisting angle of the partially coated conducting wire assembly was also measured after the Stripping Step S12 was completed but before the Annealing Step S13 was started. Hereinafter, the partially coated conducting wire assembly will be referred to as an "unannealed product". The twisting angle in Example 1 and the twisting angle in Comparative example 1 were measured. The measurement results are shown in FIG. 18. The twisting angle was measured across the length of the coated conducting wire assembly between both end portions of the coated conducting wire assembly. In the present exemplary embodiment, a suitable range for the twisting angle is an upper limit of +2 degrees and a lower limit of −2 degrees. When the twisting angle is within this suitable range, the conducting wire assembly is able to be assembled to a motor or the like with sufficient accuracy.

As shown in FIG. 18, in Example 1, the twisting angle was small compared to the twisting angle of the unannealed product. In Example 1, the twisting angle decreased due to the Annealing Step S13. Further, in Example 1, the twisting angle remains within the suitable range for the twisting angle across the length of the coated conducting wire assembly. As a result, the conducting wire assembly of Example 1 is able to be assembled to a motor or the like with sufficient accuracy.

On the other hand, in Comparative Example 1, the twisting angle was large compared to the twisting angle of the unannealed product. In Comparative Example 1, the twisting angle may have increased due to the step corresponding to the Annealing Step S13 described above.

Test Example

Figure 19:
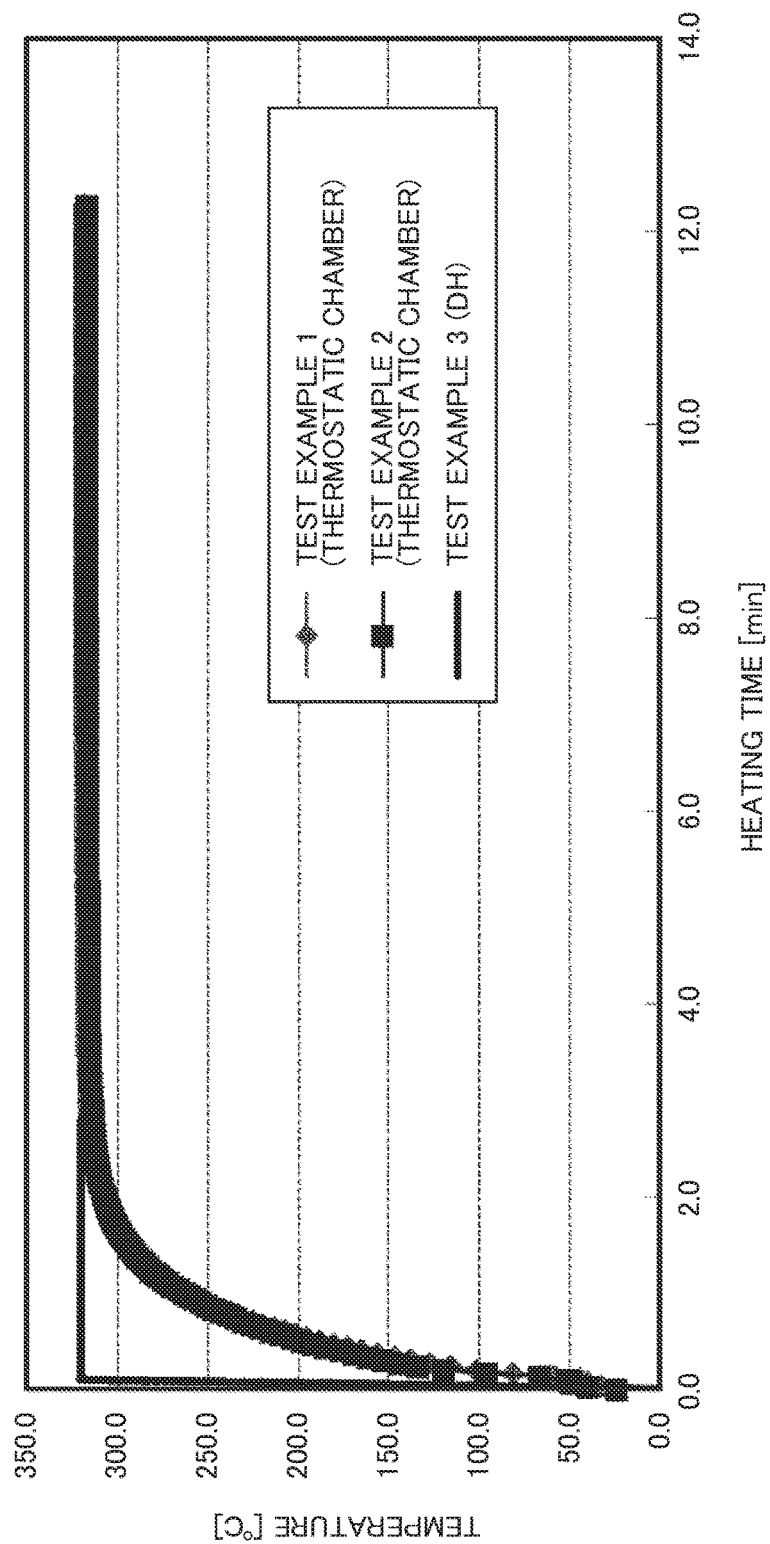
FIG. 19 is a graph showing a temperature with respect to a heating time.

Next, test examples will be described with reference to FIG. 19. FIG. 19 is a graph illustrating temperature with respect to heating time.

In Test Example 1, a conducting wire assembly having the same structure as the partially coated conducting wire assembly 206 (see FIG. 10) without the insulation coating 206a was heated and held using a thermostatic chamber. The thermostatic chamber is able to heat an object arranged inside the thermostatic chamber, by generating heated air for example. The conducting wire assembly was heated within the thermostatic chamber. This heated and held conducting wire assembly that lacks an insulation coating has the same structure as the conducting wire assembly 206b, and is made from a plurality of copper wires for example. In the present exemplary example, the annealing temperature was approximately 320° C.

In Test Example 2, a conducting wire assembly that has the same structure as the partially coated conducting wire assembly 206 (see FIG. 10) was heated and held using a thermostatic chamber just as in Test Example 1. This heated and held conducting wire assembly includes a conducting wire assembly that is made from a plurality of copper wires for example, and an insulation coating made of fluorine resin for example. In the present exemplary example, the annealing temperature was approximately 320° C.

In Test example 3, a conducting wire assembly that has the same structure as the partially coated conducting wire assembly 206 (see FIG. 10) was heated by direct resistance heating, just as in the Direct Resistance Heating Step S2132 (see FIG. 15) in the manufacturing method according to the exemplary embodiment described with reference to FIGS. 15-17. This heated and held conducting wire assembly includes a conducting wire assembly that is made from a plurality of copper wires for example, and an insulation coating made of fluorine resin for example. In the present exemplary example, the annealing temperature was approximately 320° C.

Heating in Test Examples 1-3 was started, and, after reaching the annealing temperature, the temperatures of the conducting wire assemblies were measured at least until the temperatures stabilized. These measurement results are shown in FIG. 19.

In Test Examples 1 and 2, approximately two minutes passed until the temperatures of the conducting wire assemblies reached the annealing temperature. On the other hand, in Test Example 3, approximately 0.1 minutes passed until the temperature of the conducting wire assembly reached the annealing temperature. That is, the elapsed time until the temperature of the conducting wire assembly reached the annealing temperature was shorter in Test Example 3 than it was in Test Examples 1 and 2. That is, the rate of temperature increase in Test Example 3 was faster than the rates of temperature increase in Test Examples 1 and 2. One reason for this may be that direct resistance heating generates Joule heat in the conducting wire assembly. As a result, there is a tendency for the temperature to rise more rapidly compared to heating within a thermostatic chamber or an annealing furnace.

Figure 20:
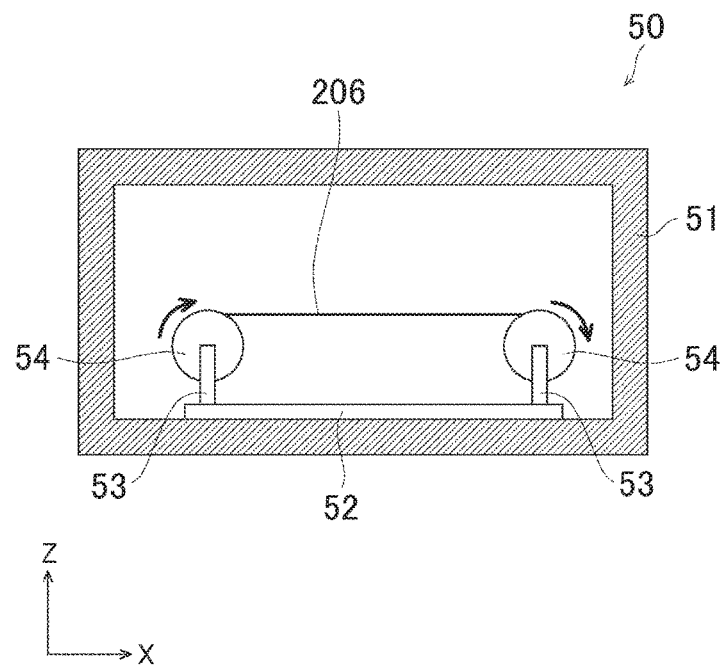
FIG. 20 is a view showing a frame format of a step of the method of manufacturing the coated conducting wire assembly according to an exemplary embodiment.
Figure 21:
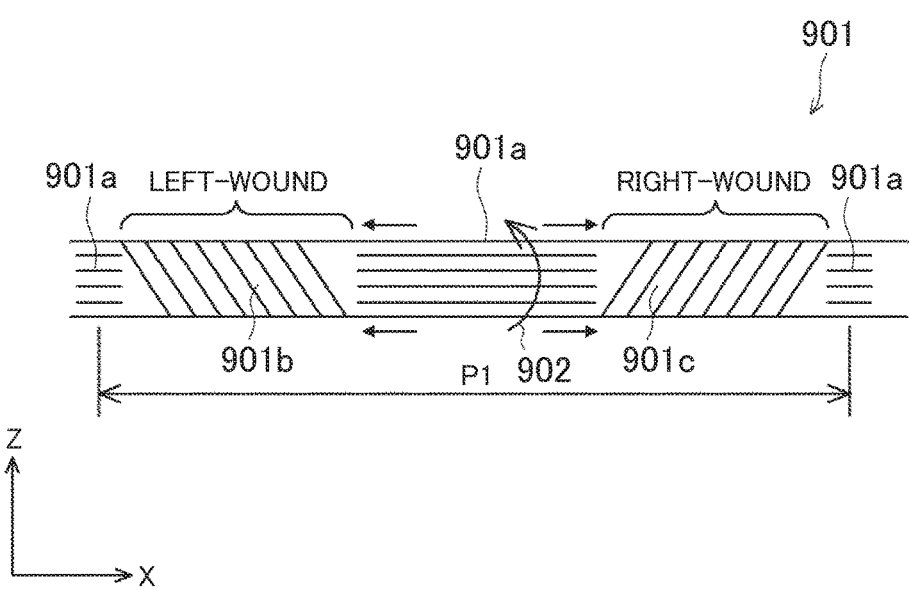
FIG. 21 is a view showing a frame format of a conducting wire assembly manufactured using a related method of manufacturing a coated conducting wire assembly.
Figure 22:
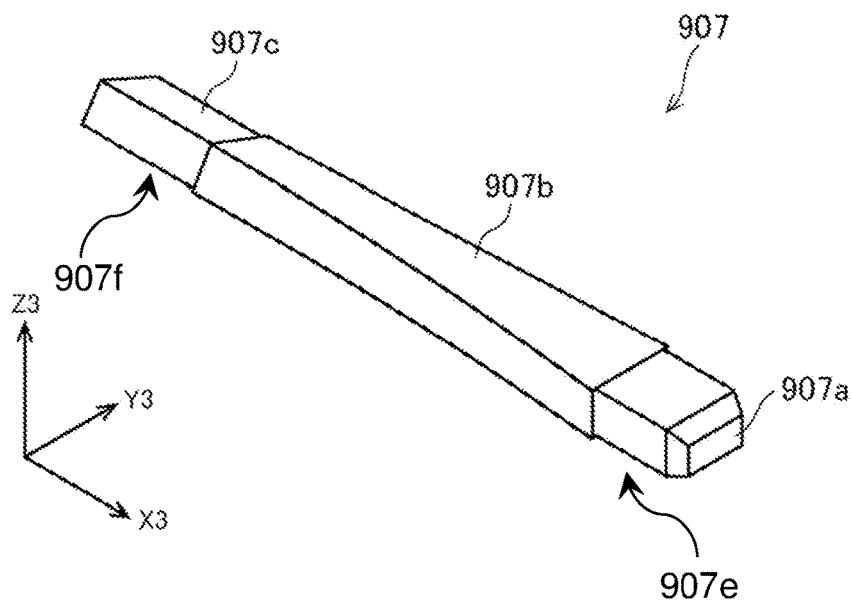
FIG. 22 is a perspective view of an example of a conducting wire assembly manufactured according to a related method of manufacturing a coated conducting wire assembly.

The present disclosure is not limited to the exemplary embodiments described above. That is, suitable modifications within the scope of the present disclosure are also possible. For example, with the methods of manufacturing a conducting wire assembly according to the exemplary embodiments described above with reference to FIGS. 1-17, the steps from the Cutting Step S10 to the Annealing Step S13 are performed, but an Annealing Step S313 may be performed instead of the steps from the Cutting Step S10 to the Annealing Step S13. The Annealing Step S313 may be performed using an annealing apparatus 50 shown in FIG. 20. The annealing apparatus 50 includes a furnace chamber 51, a holding base 52, two roller supporting portions 53 provided on opposing end portions of the holding base 52, and two rollers 54 that are rotatably supported by the roller supporting portions 53, respectively. Each of the two rollers 54 is provided with technical means that enables it to rotate, rotate in reverse, and stop. An end portion of the partially coated conducting wire assembly 206 is wound around each of the two rollers 54. Tension is applied to the partially coated conducting wire assembly 206 by rotating the rollers 54 in opposite directions. In particular, tension is applied such that the partially coated conducting wire assembly 206 extends substantially straight. A first end portion of the partially coated conducting wire assembly 206 may be prevented from twisting with respect to a second end portion of the partially coated conducting wire assembly 206. In other words, the twisting angle, i.e., the angle of the first end portion of the partially coated conducting wire assembly 206 with respect to the second end portion of the partially coated conducting wire assembly 206, is essentially 0° (zero degrees). Annealing may be performed by heating and holding the furnace chamber 51. Also, according to the present exemplary method of manufacturing a conducting wire assembly, annealing may be performed even if the steps from the Cutting Step S10 to the Stripping Step S12 are omitted. Tension may also be applied to the partially coated conducting wire assembly 206 by providing a mechanism that moves at least one of the roller supporting portions 53, and changing the distance between the roller supporting portions 53 while rotation of the rollers 54 is prevented.

Also, with the method of manufacturing a conducting wire assembly according to the exemplary embodiments described above with reference to FIGS. 1-17, the steps from the Single Wire Rolling Step S1 to the Annealing Step S13, S132 are performed, but at least one of the steps from the Single Wire Rolling Step S1 to the Annealing Step S13, S132 may be omitted as necessary. Also, with the method of manufacturing a conducting wire assembly according to the exemplary embodiments described above with reference to FIGS. 1-17, annealing is performed while tension is applied, but tension may be applied at the same time that annealing starts or after annealing has started.

What is claimed is:

1. A method of manufacturing a coated conducting wire assembly, the method comprising:
bundling a plurality of conducting wires to thereby form a conducting wire bundle;
twist-deforming the conducting wire bundle to thereby form a conducting wire assembly;
covering the conducting wire assembly with an insulation coating to thereby form a coated conducting wire assembly; and
annealing the coated conducting wire assembly by heating and holding the coated conducting wire assembly at an annealing temperature while applying tension to the coated conducting wire assembly.

2. The manufacturing method according to claim 1, wherein:
the conducting wire assembly is formed to include at least one parallel portion, a left-wound portion, and a right-wound portion.

3. The manufacturing method according to claim 1, wherein:
the coated conducting wire assembly includes at least one conducting portion where the conducting wire assembly is exposed.

4. The manufacturing method according to claim 3, wherein:
the annealing comprises heating the coated conducting wire assembly to raise a temperature of the coated conducting wire assembly to the annealing temperature by direct resistance heating.

5. The manufacturing method according to claim 4, wherein:
the direct resistance heating is performed by supplying a current to the at least one conducting portion of the coated conducting wire assembly.

6. The manufacturing method according to claim 1, wherein:
the annealing comprises applying tension to the coated conducting wire assembly while both end portions of the coated conducting wire assembly are fixed such that an angle of twist from untwisting deformation is maintained within a range of predetermined angles.

7. The manufacturing method according to claim 6, wherein:
the range of predetermined angles is between +2 degrees and −2 degrees.

8. The manufacturing method according to claim 6, wherein:
the angle of twist is maintained at essentially 0 degrees.

9. The manufacturing method according to claim 1, further comprising:
shortening the coated conducting wire assembly by cutting the coated conducting wire assembly.

10. The manufacturing method according to claim 1, the method further comprising:
pressure rolling the conducting wire bundle to thereby provide the conducting wire bundle with a rectangular cross-section.

11. A method of manufacturing a coated conducting wire assembly, the method comprising:
bundling a plurality of conducting wires to thereby form a conducting wire bundle;
twist-deforming the conducting wire bundle to thereby form a twisted assembly conductor;
applying pressure to the twisted assembly conductor to thereby form a first assembly conductor, wherein the first assembly conductor includes a core wire and a plurality of peripheral wires;
forming an oxide film between the core wire and the plurality of peripheral wires and between the peripheral wires to thereby form a second assembly conductor;
covering the second assembly conductor with an insulation coating to thereby form a coated conducting wire assembly;
cutting the coated conducting wire assembly to thereby form a shortened conducting wire assembly;
cutting and stripping the insulation coating from at least one end portion of the shortened conducting wire assembly to thereby form a partially coated conducting wire assembly; and
annealing the partially coated conducting wire assembly by heating the partially coated conducting wire assembly to an annealing temperature and maintaining the annealing temperature for a predetermined period of time while applying tension to the partially coated conducting wire assembly.

12. The manufacturing method according to claim 11, wherein:
the twisted assembly conductor is formed to include at least one parallel portion, a left-wound portion, and a right-wound portion.

13. The manufacturing method according to claim 11, wherein:
cutting and stripping the insulation coating from the least one end portion of the shortened conducting wire assembly exposes at least one portion of the plurality of conducting wires.

14. The manufacturing method according to claim 13, wherein:
the annealing comprises heating the partially coated conducting wire assembly to raise a temperature of the partially coated conducting wire assembly to the annealing temperature by direct resistance heating.

15. The manufacturing method according to claim 14, wherein:
the direct resistance heating is performed by supplying a current to the at least one exposed portion of the plurality of conducting wires.

16. The manufacturing method according to claim 11, wherein:
the annealing comprises applying tension to the partially coated conducting wire assembly while both end portions of the partially coated conducting wire assembly are fixed such that an angle of twist from untwisting deformation is maintained within a range of predetermined angles.

17. The manufacturing method according to claim 16, wherein:
the range of predetermined angles is between +2 degrees and −2 degrees.

18. A method of manufacturing a coated conducting wire assembly, the method comprising:
bundling a plurality of conducting wires to thereby form a conducting wire bundle;
twist-deforming the conducting wire bundle to thereby form a conducting wire assembly;
covering the conducting wire assembly with an insulation coating to thereby form a coated conducting wire assembly;
heating the coated conducting wire assembly to raise a temperature of the coated conducting wire assembly to an annealing temperature by direct resistance heating while applying tension to the coated conducting wire assembly; and annealing the coated conducting wire assembly by heating and holding the coated conducting wire assembly within a furnace at the annealing temperature while applying tension to the coated conducting wire assembly.

19. The manufacturing method according to claim 18, wherein:

tension is applied to the coated conducting wire assembly while both end portions of the coated conducting wire assembly are fixed such that an angle of twist from untwisting deformation is maintained within a range of predetermined angles.

20. The manufacturing method according to claim 19, wherein:

the range of predetermined angles is between +2 degrees and −2 degrees.

* * * * *